Aug. 16, 1932.　　　A. CASKEY　　　1,872,120

WHEEL SCRAPER FOR AUTOMOTIVE VEHICLES

Filed Sept. 3, 1931

INVENTOR.
AUGUST CASKEY
BY
M. Talbert Dick
ATTORNEY.

Patented Aug. 16, 1932

1,872,120

UNITED STATES PATENT OFFICE

AUGUST CASKEY, OF JAMAICA, IOWA

WHEEL SCRAPER FOR AUTOMOTIVE VEHICLES

Application filed September 3, 1931. Serial No. 560,911.

The principal object of my invention is to provide a scraper for removing excessive foreign matter from the traction wheels of automotive vehicles such as tractors, tanks and the like.

A further object of this invention is to provide a wheel scraper for traction wheels that removes dirt and the like from the wheels without interfering with the spade lugs on the periphery of the wheels.

A still further object of my invention is to provide a scraper for the traction wheels of tractors and the like that may be easily attached or detached from the tractor without necessitating the services of a skilled mechanic.

A still further object of this invention is to provide a scraper for wheels that may be easily released from or placed in an operative position.

A still further object of my invention is to provide a wheel scraper for automotive vehicles that will automatically be thrown out of an operative position in cases where the scraper portion engages an immovable object, wedges in the spade lugs or accidentally engages the spade lugs themselves, thereby preventing breakage of the device.

A still further object of this invention is to provide a wheel scraper for automotive vehicles that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

On most traction wheels it is imperative that spade lugs be used in order to obtain successful traction with the ground surface over which the wheels are moving. These spade lugs, however, soon collect much earth and other material between themselves, thereby destroying their efficiency as well as packing the ground over which the wheels pass. I have overcome these disadvantages as will hereinafter be appreciated by those familiar with the art.

Figure 1:
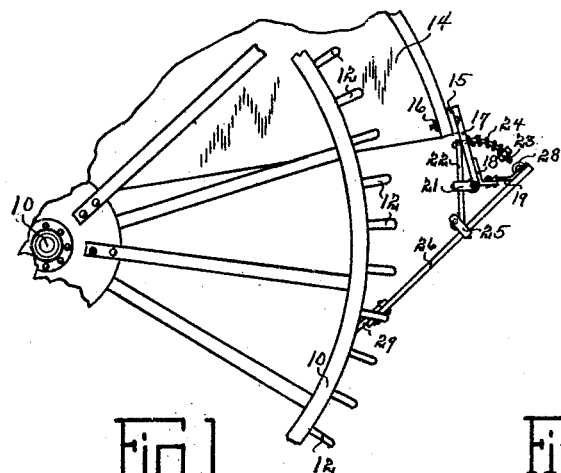
Fig. 1 is a side view of a portion of a traction wheel and fender with my device secured to the same and in an operative position.
Figure 2:
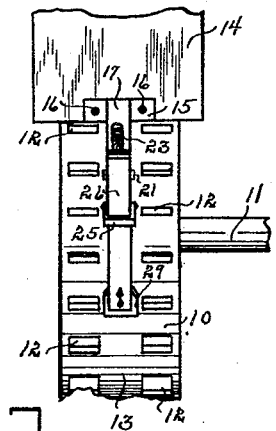
Fig. 2 is a back view of a portion of a traction wheel and fender with my invention secured thereto ready for use.

I have used the numeral 10 to designate the ordinary rear traction wheel of a tractor or like having the driving axle 11. Secured by a suitable means on the periphery of the wheel 10 are the two rows of spade lugs 12. It should here be noted that these spade lugs are spaced apart and are in two rows, as shown in Fig. 1, to provide a relatively clear path 13 in the center of the rim of the wheel 10. Secured to the vehicle having the tractor wheel 10 by any suitable means is the usual wheel fender, which I have designated by the numeral 14.

Figure 3:
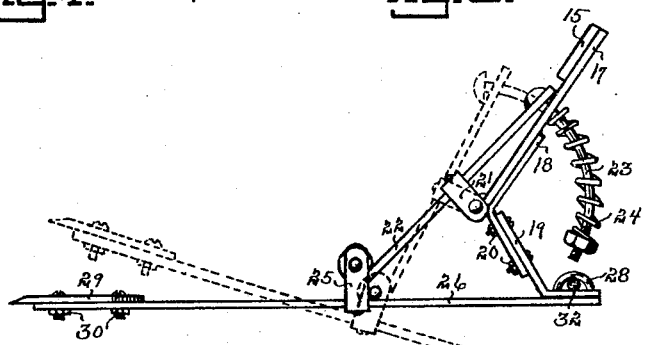
Fig. 3 is a side view of my invention detached from a tractor and more fully illustrates its construction.
Figure 4:
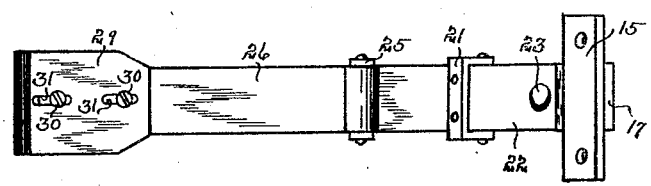
Fig. 4 is a top plan view of my complete device.

I have used the numeral 15 to designate the base portion of my device, which is detachably secured to the fender or like 14 by a bolt 16. Brazed or otherwise secured to the base member 15 is a downwardly and slightly outwardly extending bar 17, as shown in Fig. 1. The numeral 18 designates an angle iron secured to the lower back portion of the member 17 by brazing or the like. This angle iron 18 has its free end extending in approximately a horizontal line and to the rear, as shown in the drawing. The numeral 19 designates a second angle iron having one end portion secured to the free end portion of the angle iron 18 by bolts or the like 20, as shown in Fig. 3. The angle of this last angle iron is such that its outer rear end portion extends to the rear and slightly upwardly, as shown in Fig. 1. The numeral 21 designates a U-member pivoted by suitable means near its two ends to the lower end of the member 17. The numeral 22 designates a bar rigidly secured by rivets or the like to the center portion of the U-member 21. The point at which the member 22 is secured to the member 21 is approximately at the center of the member 22, thereby making that member capable of having its upper end swung to a position in engagement with the forward side of the member 17. The numeral 23 designates a bolt having its length extending in a curve and loosely passing through the upper end portion of the member 22 and through the member 17.

Figure 5:
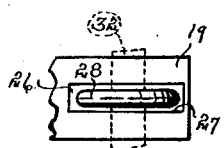
Fig. 5 is a top plan view of the rear end portion and assembly of the scraping blade supporting arm.

The numeral 24 designates a coil spring embracing the curved bolt 23 having one end engaging the nut of the bolt and its other end engaging the outer or rear side of the member 17, as shown in Fig. 3. The numeral 25 designates a second U-member having its two ends pivotally secured by suitable means to the lower end of the bar 22. Rigidly secured near its center by suitable means to the central portion of the U-member 25 is the scraping blade arm 26. This arm 26 is of such length that its rear end is capable of normally engaging the outer end portion of the member 19. The numeral 27 designates a slot in the outer end portion of the angle iron 19, as shown in Fig. 5. The numeral 28 designates a loop ear member rigidly secured to the rear end portion of the arm 26 and capable of entering and engaging the slot 27 when the rear end of the arm 26 is adjacent the outer end portion of the angle iron 19. The numeral 29 designates the scraping blade member secured by any suitable means to the forward end of the arm 26. In the drawing, I show this member secured to the arm 26 by screws 30 threaded into the arm and extending through elongated longitudinal slots 31 respectively in the scraping blade member 29. By this arrangement, the scraping blade member is not only detachably secured to the arm 26, but may be adjusted longitudinally relative to the arm, thereby selectively positioning the scraping blade on the periphery of the wheel 10 during the scraping function. The numeral 32 designates a breakable member such as a stick of wood, corn-cob, or like that is placed through the loop ear 28 after it has been inserted in the slot 27 to extend above the angle iron 19, as shown in Fig. 3.

By this arrangement of parts it will readily be seen that if a stick, stone, or the like becomes caught or so wedged between the spade lugs 12 that the scraping blade member cannot remove the same from the wheel, the scraping blade with its arm 26 will be forced upwardly and to the rear. This action will cause the two U-members 21 and 25 to pivot on their axes, thereby compressing the coil spring 24 and forcing the rear end of the arm 26 to move away from the fixed angle iron 19 with such force as to break the member 32. With the member 32 broken and the loop ear relieved from engagement in and through the slot 27 the forward end of the arm 26 may move upwardly and around with the periphery of the wheel 10, thereby preventing serious damage being done to the invention or the vehicle to which the invention is secured. The resistance offered by the device from traveling a short distance with the periphery of the wheel, as we have just above described, will depend upon the tension of the coil spring 24 and the breakability of the member 32. At any event, the resistance should be great enough that the device would not have a tendency to relinquish its scraping function unless it meets with serious resistance. To adjust the tension of the spring 24 it is merely necessary to rotate the nut of the curved bolt 23. The arc cut by this bolt 23 should be that of a circle having its dead center with the pivot points of the U-member 21, as shown in Fig. 3.

One of the advantages of the invention is that it consists of one single assembly and may be removed or replaced on the vehicle as such.

The device may be easily and quickly placed in an operative functioning position after having been tripped by merely moving the arm 26 against the spring 24 to a position as shown in Fig. 1, and inserting another breakable member 32 through the loop ear 28.

In many instances, however, when the scraping function is not greatly taxed it will be unnecessary to employ a breakable member 32 as the tension of the spring 24 will in itself yieldingly hold the scraper in a functioning position adjacent the periphery of the wheel 10.

One of my scraping devices should be used with each drive wheel of a tractor or like having the traction lugs.

From the foregoing it will readily be appreciated that I have provided a very desirable scraper for wheels that may be quickly installed and used by any automotive vehicle operator.

Some changes may be made in the construction and arrangement of my improved wheel scraper for automotive vehicles without departing from the real spirit and purpose of my invention, and it is my invention to cover by my claims any modified forms of structure or use of mechanical equivalents which may be reasonably included within their scope.

I claim:

1. In a scraper for vehicle wheels, a downwardly extending bar designed to be secured to the vehicle, an angle iron operatively secured to the rear side of said bar and having an opening in its outer end portion, a U-member pivotally secured to said bar, a second bar secured near its center to said U-member, a second U-member secured to the lower end portion of said second bar, a means for yieldingly holding the upper end of said second bar adjacent said first bar, a scraper arm bar secured to said second U-member near its center, and a projecting member on the rear end portion of said scraper arm bar capable of extending into said opening in said angle iron when said scraper arm bar is in a normal functioning position.

2. In a scraper for vehicle wheels, a downwardly extending bar designed to be secured to the vehicle, an angle iron operatively secured to the rear side of said bar and having an opening in its outer end portion, a U-member pivotally secured to said bar, a second bar secured near its center to said U-member, a second U-member secured to the lower end portion of said second bar, a means for yieldingly holding the upper end of said second bar adjacent said first bar, a scraper arm bar secured to said second U-member near its center, a projecting member on the rear end portion of said scraper arm bar capable of extending into said opening in said angle iron when said scraper arm bar is in a normal functioning position, and a scraping blade on the forward end of said scraper arm bar.

3. In a scraper for vehicle wheels, a downwardly extending bar designed to be secured to the vehicle, a rearwardly extending member on said bar having an opening, a U-member pivotally secured at its two ends to said bar, a second bar secured near its center to the central portion of said U-member, a second U-member secured at its two ends to the lower end portion of said second bar, a means for yieldingly holding the upper end of said second bar to said first bar, a scraper arm bar secured near its center to the central portion of said second U-member, and a projecting member on the rear end portion of said scraper arm bar capable of extending into and engaging said opening for normally retaining said scraper arm bar when in a functioning position.

4. In a scraper for vehicle wheels, a downwardly extending bar designed to be secured to the vehicle, a rearwardly extending member on said bar having an opening, a U-member pivotally secured at its two ends to said bar, a second bar secured near its center to the central portion of said U-member, a second U-member secured at its two ends to the lower end portion of said second bar, a means for yieldingly holding the upper end of said second bar to said first bar, a scraper arm bar secured near its center to the central portion of said second U-member, a loop member secured to the rear end portion of said scraper arm bar capable of extending through said hole in said member when said scraper arm bar is in a functioning position, and a breakable member extending through said loop member for normally holding said loop member into and through said opening.

5. In a scraper for vehicle wheels, a downwardly extending bar designed to be secured to the vehicle, a rearwardly extending member secured to said bar, a U-member pivotally secured to said bar, a second bar secured near its center to said U-member, a second U-member secured to the lower end portion of said second bar, a bolt loosely extending through the upper end portion of said second bar and said first bar, a coil spring embracing said bolt having one end engaging one end of said bolt and its other end engaging said first bar, a scraper arm bar secured to said second U-member, and a breakable means for holding the rear end portion of said scraper arm bar to said rearwardly extending member.

6. In a scraper for vehicle wheels, a downwardly extending bar designed to be secured to the vehicle, a rearwardly extending member secured to said bar, a U-member pivotally secured to said bar, a second bar secured near its center to said U-member, a second U-member secured to the lower end portion of said second bar, a curved bolt loosely extending through the upper end portion of said second bar and said first bar, a coil spring embracing said bolt having one end engaging one end of said curved bolt and its other end engaging said first bar, a scraper arm bar secured to said second U-member, and a breakable means for holding the rear end portion of said scraper arm bar to said rearwardly extending member.

7. In a scraper for vehicle wheels, a bar designed to be detachably secured to the vehicle, a rearwardly extending member on said bar, a U-member pivotally secured to said bar, a second bar secured near its center to said U-member, a second U-member secured to the lower end portion of said second bar, a means for yieldingly holding the upper end of said second bar to said first bar, a scraper arm bar secured near its center to said second U-member, a releasable means for normally holding the rear end portion of said scraper arm bar to said rearwardly extending member, and a detachable scraping blade on the forward end of said scraper arm bar.

8. In a scraper for vehicle wheels, a bar designed to be detachably secured to the vehicle, a rearwardly extending member on said bar, a U-member pivotally secured to said bar, a second bar secured near its center to said U-member, a second U-member secured to the lower end portion of said second bar, a means for yieldingly holding the upper end of said second bar to said first bar, a scraper arm bar secured near its center to said second U-member, a releasable means for normally holding the rear end portion of said scraper arm bar to said rearwardly extending member, and a scraping blade longitudinally adjustable on the forward end of said scraper arm bar.

AUGUST CASKEY.